Figure 1:
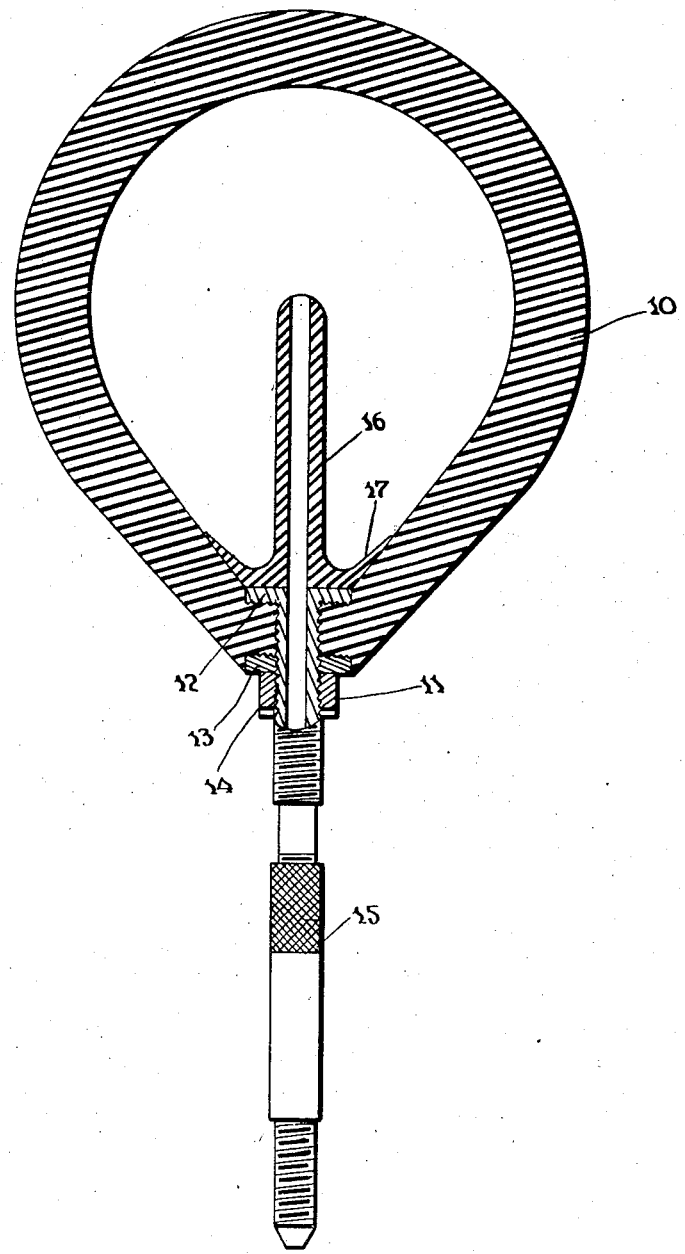

Dec. 11, 1928.

C. VAN RENNES 1,694,872

AIRBAG VALVE

Filed Dec. 19, 1927

Inventor
Cornelis Van Rennes.

By

Attorney

Patented Dec. 11, 1928.

1,694,872

UNITED STATES PATENT OFFICE.

CORNELIS VAN RENNES, OF AKRON, OHIO, ASSIGNOR TO THE GOODYEAR TIRE & RUBBER COMPANY, OF AKRON, OHIO, A CORPORATION OF OHIO.

AIR-BAG VALVE.

Application filed December 19, 1927. Serial No. 240,952.

This invention relates to airbags of the type utilized as cores for pneumatic tire casings during the vulcanizing operation and it has particular relation to valves for inflating and deflating such bags.

When the use of rubber airbags as cores for pneumatic tires was first proposed and practised, the heat of the vulcanizing operation overcured the material of the bags and caused cracking and breaking thereof after use in only one or two tires. This difficulty has now been overcome by the utilization of a liquid, such as glycerine, to coat the interior surface of the bag, which serves to obviate deterioration by preventing overcuring and oxidation.

A single airbag may now be used to cure about fifty tires before the exterior surface of the bag becomes checked. The exterior of the bag is then ground off and a new cover is applied, after which the bag may be again utilized. The use of glycerine or a similar liquid in the cores is essential as it permits of the use of a single core for the curing of from one hundred to two hundred tires, whereas it was formerly possible to cure comparatively few tires with a single bag.

Considerable difficulty has been experienced by reason of the discharge of the glycerine from the valve of the bag during manipulation thereof. Although only a small amount of the liquid, for example one-half pint to two quarts, is utilized in each bag, a portion of the liquid often collects within the hollow of the valve and, when pressure is subsequently exerted upon the bag, the liquid is thrown out of the valve and falls upon the tire or tires to be vulcanized. Since the liquid possesses properties that retard vulcanization of the rubber with which it comes in contact, portions of the uncured tires upon which the glycerine falls cannot thereafter be properly vulcanized and blemishes on the finished product result.

The essential object of this invention is to provide a valve for an airbag designed to prevent flow of the glycerine or other contained liquid into the valve so that it cannot be subsequently thrown out upon the vulcanized tire.

A further object of the invention is to provide an airbag having a flexible valve extension which is disposed within the bag and extends an appreciable distance from the wall of the body of the bag.

For a better understanding of the invention, reference may now be had to the accompanying drawing, forming a part of the disclosure, which is a cross-sectional view of an airbag and valve embodying the essential features of the invention.

In the particular embodiment of the invention illustrated in the accompanying drawing, an airbag 10 is equipped with the usual rigid tube 11 secured in operative position by means of its flange 12, washer 13 and nut 14. The tube 11 is exteriorly threaded in order that different types of extensions 15 may be utilized for attachment to various forms of hose fittings.

In order to prevent entrance of fluid, such as glycerine, into the tube 11, a second tube 16, formed with a circular flange 17, is vulcanized or otherwise secured to the flange 12 and to the interior of the bag 10. The tube 16 is preferably flexible and may be made of the same material as the bag 10, which permits of the bag being flexed or collapsed in the region of the valve without damage either to the valve or to the bag.

Although the tube 16 is shown as extending approximately to the center of the interior of the bag and as secured to the body 10 by means of its flange 17, it is to be understood that the tube may be made longer or shorter or it may be formed with a smaller flange 17 and be secured only to the flange 12, for example by vulcanization, to constitute with the tube 11 an article of manufacture adapted for association with any airbag. That is, it is not essential that the tube 16 be secured directly to the bag 10 because it will be properly positioned when the tube 11, to which it is secured, is connected to the bag by means of the flange 12, washer 13 and nut 14.

From the foregoing description it will be apparent that fluid contained within the bag cannot enter the tube 16 by reason of the fact that the end thereof is disposed an appreciable distance from the wall of the bag and that damage to the bag by engagement with the tube 16 is prevented by reason of the flexible character of the latter.

Although I have illustrated only one form which the invention may assume and have described in detail only a single application thereof, it will be apparent to those skilled in the art that the invention is not so limited, but that various minor modifications may be made ...erein without departing from the spirit of the invention or from the scope of the appended claims.

What I claim is:

1. An airbag comprising a hollow body and a tube traversing the wall of the body and terminating within the body an appreciable distance from the wall thereof, the portion of the tube disposed within the body being flexible.

2. An airbag comprising a hollow body and a tube traversing the wall of the body and terminating within the body an appreciable distance from the wall thereof, the portion of the tube disposed within the body being formed of airbag body material.

3. An airbag comprising a hollow body, a tube traversing the wall of the body and a flexible flanged tube vulcanized to the body in alignment with the first tube.

4. An airbag comprising a hollow body and a tube traversing the body, said tube including a rigid portion and a flexible portion disposed entirely within the body and terminating an appreciable distance from the wall of the body.

5. An airbag including a hollow body, a tube traversing the body and a flexible tube vulcanized to the body and to the first mentioned tube and extending an appreciable distance within the body and terminating an appreciable distance from the wall of the body.

6. An airbag valve comprising a rigid tube, means on the tube for securing it to an airbag and a flexible tube vulcanized to the first mentioned tube.

7. An airbag valve comprising a rigid tube, means on the tube for securing it to an airbag and a flexible tube formed with a flange vulcanized to the first mentioned tube.

8. An airbag valve comprising a rigid tube, means on the tube for securing it to an airbag and a flexible tube formed with a flange adapted to be vulcanized to the wall of an airbag vulcanized to the first mentioned tube.

In witness whereof, I have hereunto signed my name.

Signed at Akron, in the county of Summit, and State of Ohio, this 17th day of December, 1927.

CORNELIS VAN RENNES.